March 3, 1970 R. C. GOODMAN ET AL 3,499,147
CASSETTE FOR RADIOGRAPHIC FILM MATERIAL
Filed March 14, 1967 4 Sheets-Sheet 1
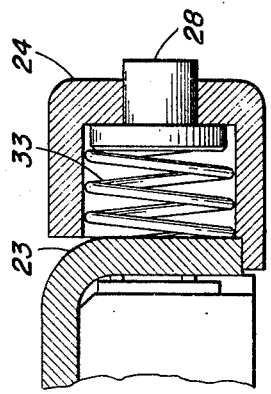
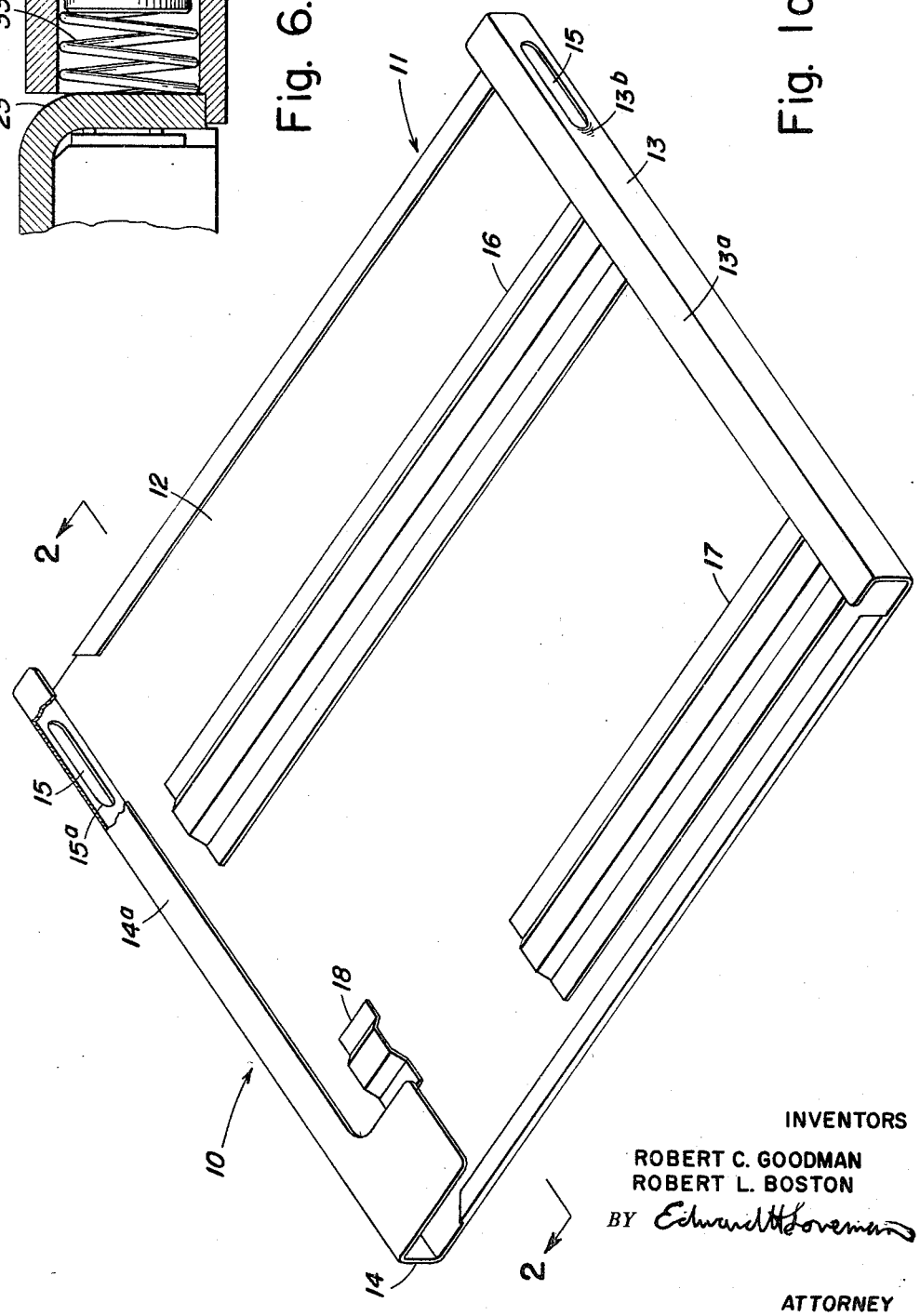
INVENTORS
ROBERT C. GOODMAN
ROBERT L. BOSTON
BY Edward H. Loveman
ATTORNEY March 3, 1970     R. C. GOODMAN ET AL     3,499,147

CASSETTE FOR RADIOGRAPHIC FILM MATERIAL

Filed March 14, 1967     4 Sheets-Sheet 2

INVENTORS
ROBERT C. GOODMAN
ROBERT L. BOSTON

BY Edward H. Loveman

ATTORNEY

March 3, 1970 R. C. GOODMAN ET AL 3,499,147
CASSETTE FOR RADIOGRAPHIC FILM MATERIAL
Filed March 14, 1967 4 Sheets-Sheet 3

INVENTORS
ROBERT C. GOODMAN
ROBERT L. BOSTON
BY Edward H. Loveman
ATTORNEY

INVENTORS
ROBERT C. GOODMAN
ROBERT L. BOSTON
BY Edward H. Loveman

ATTORNEY

United States Patent Office 3,499,147
Patented Mar. 3, 1970

3,499,147
CASSETTE FOR RADIOGRAPHIC
FILM MATERIAL
Robert C. Goodman, Binghamton, and Robert L. Boston, Vestal, N.Y., assignors to GAF Corporation, a corporation of Delaware
Filed Mar. 14, 1967, Ser. No. 622,957
Int. Cl. G01n 23/04
U.S. Cl. 250—68
2 Claims

ABSTRACT OF THE DISCLOSURE

This invention relates to photographic film cassettes. The cassette utilizes a sandwich-type film holder in combination with a cassette main frame, wherein the film holder and main frame include cooperating spacer pad members adapted to compress the film holder into a light-tight structure when assembled with the main frame. The invention also contemplates an improved cassette employing a simple locking or latching device when assembled with the film holder.

---

This invention relates to photographic film cassettes and, in particular to improvements in cassettes utilized in connection with radiography.

During the making of radiographs, usually designated as X-ray pictures, it is necessary that the film cassette containing the sensitized film material be of sturdy and rigid construction, easily loaded in a darkroom, and suitable for automatic unloading of the film upon insertion of the cassette into a daylight-type processing apparatus. One such cassette, which has been proven to be generally satisfactory in meeting the aforementioned requirements, is described in U.S. Patent No. 3,286,092, assigned to the General Aniline & Film Corporation.

However, the prior art cassette disclosed in the above U.S. patent, and other cassettes presently used in radiography, require complicated and generally cumbersome constructions and locking devices in order to assure a light-tight closure for the cassette. The cassette according to the present invention overcomes the foregoing and other disadvantages encountered in the prior art by providing a cassette employing simple and improved latching and spacing means to thereby provide a light-tight, inexpensively constructed device.

It is, accordingly, a primary object of the present invention to provide a cassette adapted for simplified loading and unloading of the film.

Another object of the present invention is to provide a cassette incorporating novel and sturdy spacer pads in the construction thereof to assure a light-tight receptacle for the photographic film stored therein.

Still another object of the present invention is to provide an improved and simplified cassette for photographic film material utilizing a novel and positive locking or latching device for closing the cassette in a light-tight position.

A more particular object of the present invention is to provide a photographic film cassette employing a plurality of spacer pads located at strategic areas of the cassette and providing a light-tight receptacle for the photographic film in the cassette upon placing the latter into a locked position.

These and other objects and many of the attendant advantages of this invention will be readily appreciated as the same becomes better understood by reference to the following detailed description when considered in connection with the accompanying drawings in which:

FIG. 1a is a perspective view, showing the main frame of the cassette;

FIG. 2 is a sectional view of the cassette main frame, taken along line 2—2 in FIG. 1a;

FIG. 6 is a fragmentary sectional view of the cassette assembly of FIG. 5, taken along line 6—6.

Figure 1C:
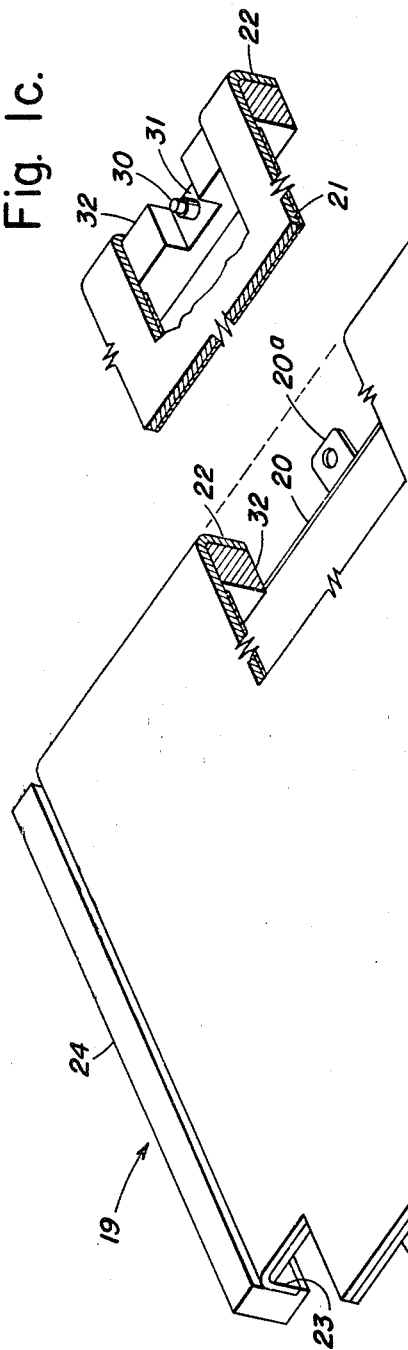
FIG. 1c is a fragmentary sectional view of the film holder showing the hinge construction.
Figure 2:
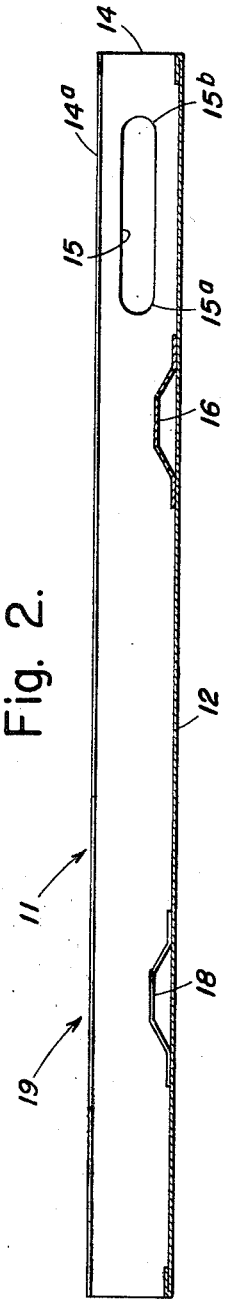

Referring now to the drawings, wherein like reference characters designate like or corresponding parts throughout the several views, there is shown in FIGS. 1a and 2 a main frame generally designated as reference numeral 11 of the cassette which has a generally flat base plate 12 and upstanding side flanges 13 and 14. The flanges 13 and 14 are turned inwardly at the top as illustrated at 13a and 14a so as to present a substantially channel-shaped configuration. Near one end of the main frame 11, flanges 13 and 14 each include an elongated slot or aperture 15 aligned with each other and similarly dimensioned in a manner to be more fully described. A portion 13b of the flange 13 surrounding the lower edge 15a of the aperture in flange 13 is elevated out of the plane of flange 13 for a purpose described below. A number of spacer pads or formed raised members are fastened on the surface of base plate 12. These spacer pads may comprise a member 16 extending over substantially the entire width of the base plate 12 in the region of the apertures 15. Another spacer pad 17 may extend across a substantial portion of the width of base plate 12 near the other edge thereof, and a further short spacer pad 18 may be located in proximity thereto. The main frame assembly may be made of a suitable corrosion resistant material, such as stainless steel. Spacer pads 16, 17 and 18 may be fastened to the base plate 12 by means of welding, spotwelding or brazing, as desired.

Figure 1B:
FIG. 1b is a perspective view, showing the film holder.

The cassette film holder generally designated as reference numeral 19 is illustarted in FIGS. 1b and 1c as having a "sandwich-type" construction and comprises a bottom plate 20 movably hinged to a top plate 21 by means of a tab 20a which is pivotably mounted on an upstanding pin 30. This pin 30 is anchored in a recess 31 of a slide member 32 which is fastened to top plate 21 by any suitable means. The upper or top plate 21 includes a rear retainer flange 22 and depending side flanges 23 which are adapted to overlap the side edges of bottom plate 20. Attached to, and substantially coextensive with side flanges 23, are elongated slide members 24. Slide members 32 and 24 may be formed of a suitable hard plastic material, although evidently other types of material may also be quite satisfactory. The film holder 19 is dimensioned so that it may be inserted into the cassette main frame 11, with slide members 24 adapted to slide into the channeled spacer provided by main frame flanges 13 and 14, and inwardly extending portions 13a and 14a.

Figure 3:
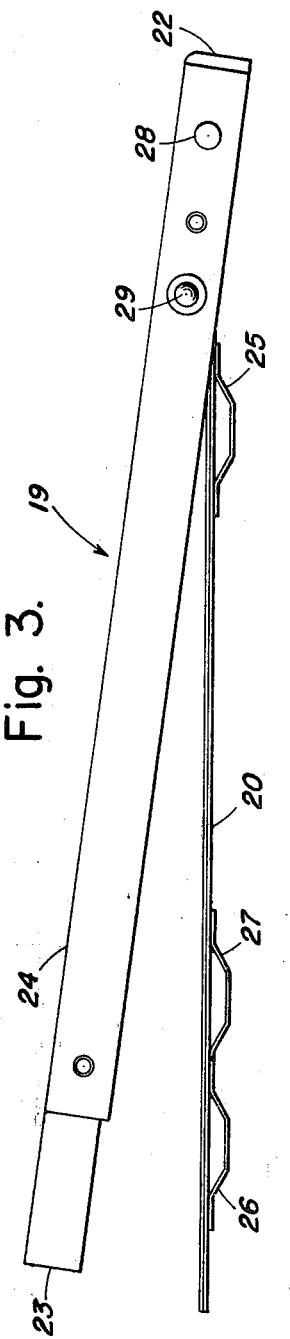
FIG. 3 is a side view of the cassette film holder, in the direction of line 3—3 in FIG. 1b.
Figure 4:
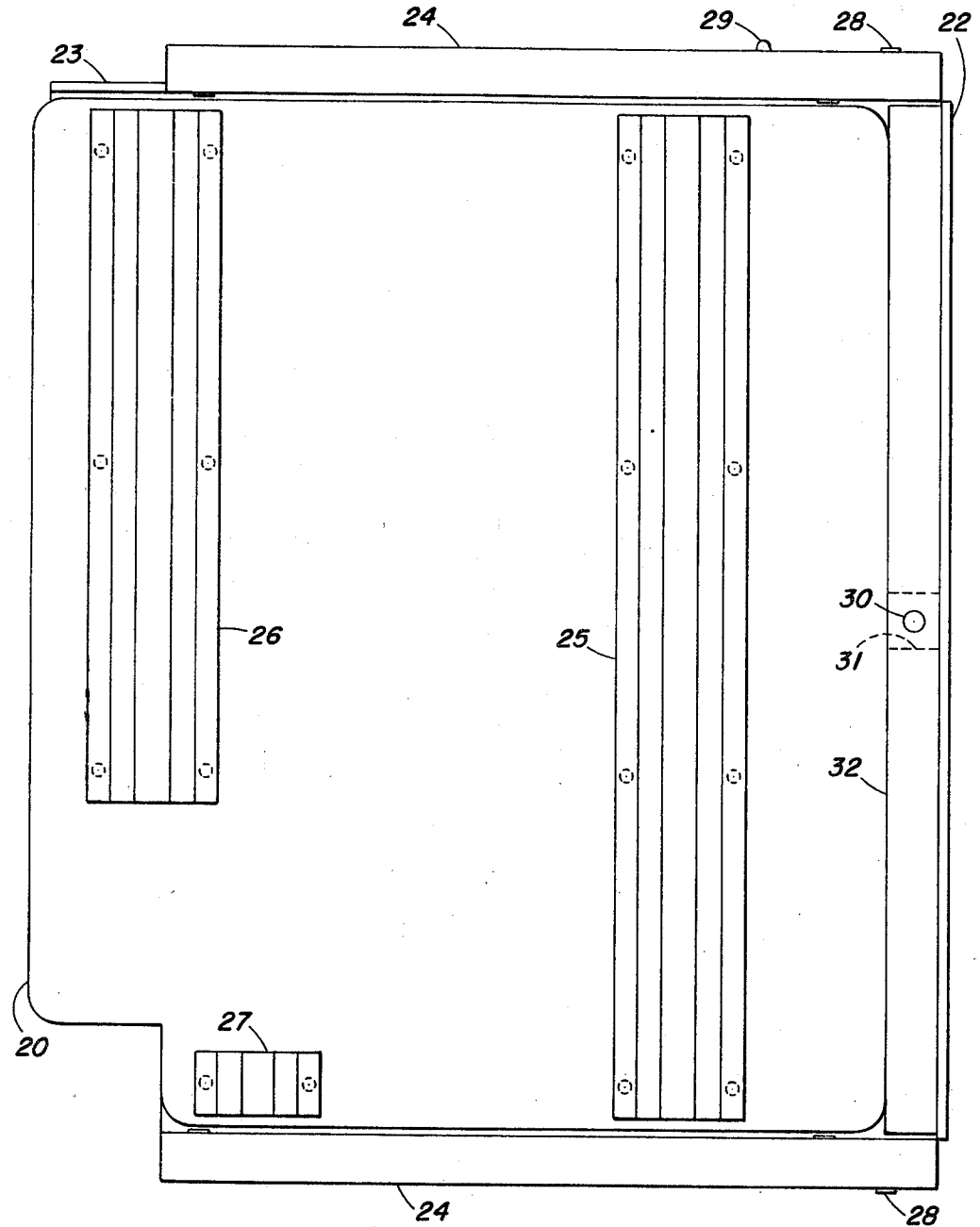
FIG. 4 is a bottom plan view of the cassette film holder of FIG. 1b.

Referring to FIGS. 3 and 4 of the drawing, bottom plate 20 of the film holder 19 includes a plurality of spacer pads or members which are attached to the lower surface thereof. Spacer pads or members 25, 26 and 27 correspond in dimensions and relative positions to each other, respectively, to spacer pads 16, 17 and 18 on the base plate 12 of main frame 11. Spacer pads 25, 26 and 27 and plates 20 and 21 of the film holder 19 may be constituted of a suitable corrosion resistant material, such as stainless steel. The spacer pads 25, 26 and 27 are fastened to bottom plate 20 by means of spotwelding, welding or brazing, and the like.

The surfaces of the film holder plates 20 and 21 which face each other, and which form the retaining space for the sensitized photographic or radiographic material may be covered by a suitable black felt material, well known in the art, and not forming a part of the present invention.

Figure 5:
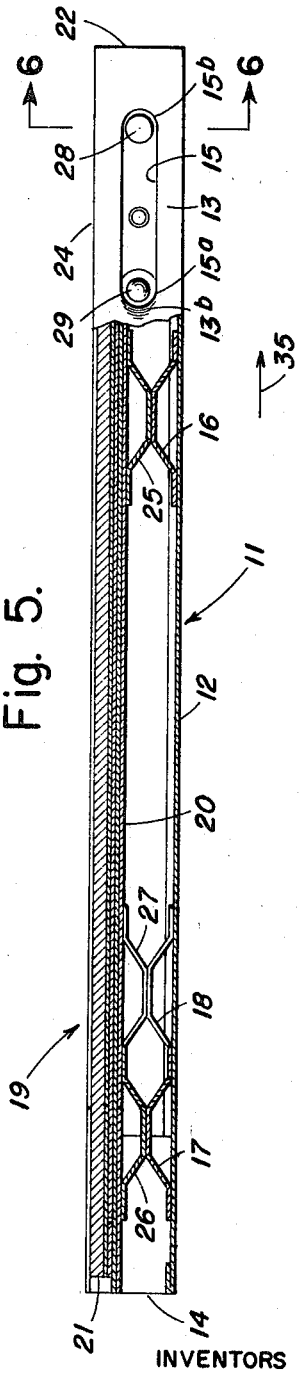
FIG. 5 is a side view, partly in section of a cassette assembly according to the present invention.

When the film holder 19 is inserted into the cassette main frame 11, as illustrated in FIGS. 5 and 6, protruding locking or retaining buttons 28 mounted in the side wall of each of the slide members 24 are adapted to project outwardly through apertures 15 in flanges 13 and 14 of the main frame 11, thus, in essence, limiting movement of the film holder 19 within the main frame 11 to a distance corresponding to the length of apertures 15. At times when the film holder is fully inserted into the main frame 11, as shown in FIG. 5, another locking button 29 mounted in one of slide members 24 projects through its adjacent aperture 15. Locking button 29 and retaining button 28 are spaced relative to each other so as to be at each end of the aperture 15, and thus retain the cassette 10 in its properly closed position. In order to assure that the locking and retaining buttons 29 and 28 respectively, at all time effect a positive lock on the cassette a resilient spring means such as a spring 33 (FIG. 6) may be provided in the slide members 24, to urge the locking buttons outwardly thereof.

Spacer pads 16, 17 and 18 on the main frame base plate 12, and spacer pads 25, 26 and 27 are located so as to be in a superimposed relationship to each other when the film holder 19 is completely inserted into main frame 11. The raised surfaces of all of the spacer pads on the main frame are in surface-engaging contact with complementary spacer pads on the slide holder and consequently exert a closing pressure force on the slide holder 19, thereby compressing plates 20 and 21 into a light-tight sandwich. This, in effect, will protect the sensitized film material housed between plates 20 and 21.

During periods when the film holder 19 may be opened, manual pressure against the hinged edge or retainer flange 22 of the plates 20 and 21 will cause locking button 29 to retract from aperture 15. This in turn, will permit the film holder to slide forward in main frame 11 until retaining buttons 28 engage the front edge of apertures 15 thereby stopping forward travel of the film holder 19 in the cassette 10. The forward motion of the film holder 19 will slidingly disengage the superimposed spacer pads 16, 17 and 18 on the main frame base plate 11, and spacer pads 25, 26 and 27 on the lower surface of bottom plate 20. As a result, the film holder plates 20 and 21 may be separated in order to provide access to the sensitized photographic film sandwich therebetween.

If it is desired to clean the film holder 19, it must be completely removed from the main frame. This may be accomplished by merely depressing retaining buttons 28 and pulling retaining flange 22 in a direction away from main frame 11, i.e. arrow 35. This motion will permit film holder 19 to slide away from main frame 28 until locking button 29 abuts the rear edge 15b (FIG. 5) of aperture 15. Thereupon depression of button 29 and pulling retainer plate 22 will cause the film slide holder 19 to slide completely free of the main frame 11 whereby it may be cleaned. To assemble the film holder 19 into the main frame 11 the foregoing procedure is merely reversed.

From the foregoing, it appears that the present film cassette provides a simple and improved cassette easily operated and obviating the need for complex and expensive components.

It should also be understood that the foregoing relates only to a preferred embodiment of the invention, and that it is intended to cover all changes and modifications of the example of the invention herein chosen for the purposes of the disclosure, which do not constitute departures from the spirit and scope of the invention.

What is claimed is:

1. A cassette for radiographic sheet material or the like, comprising in combination, a main frame having a base plate, a pair of opposed channeled sidewalls and two open sides, a film holder including a pair of plate members pivotally joined at one end and adapted to be moved apart, first means on said frame and second means on said holder, said first and second means cooperating to hold said plate members in compressed relation when said holder is in a locked position within said frame and permitting said plates to separate when said holder is in an unlocked position within said frame, the improvement comprising means for retaining said film holder within said main frame including elongated apertures in each of the channeled sidewalls of said main frame, one of said pair of plate members having slide members along side edges thereof, means projecting from said slide members into said apertures restraining movement of said film holder in said main frame between said predetermined unlocked and locked positions, and locking means adapted to project from at least one of said members into one of said apertures when said film holder and said main frame are in intimate contact with one another and in said locked position.

2. The cassette as defined in claim 1 including resilient spring means positioned in said slide members adapted to normally urge said projecting means and said locking means into aperture engaging positions.

References Cited

UNITED STATES PATENTS

| 3,286,092 | 11/1966 | Sames | 250—68 |
| 3,330,953 | 7/1967 | Erikson | 250—68 |

WILLIAM F. LINDQUIST, Primary Examiner